US011245309B2

(12) United States Patent
Marvin

(10) Patent No.: US 11,245,309 B2
(45) Date of Patent: Feb. 8, 2022

(54) LIQUID COOLED STATOR FOR HIGH EFFICIENCY MACHINE

(71) Applicant: LCDRIVES CORP., Potsdam, NY (US)

(72) Inventor: Russel Hugh Marvin, Potsdam, NY (US)

(73) Assignee: KOCH ENGINEERED SOLUTIONS, LLC, Wichita, KS (US)

(*) Notice: Subject to any disclaimer, the term of this patent is extended or adjusted under 35 U.S.C. 154(b) by 0 days.

(21) Appl. No.: 16/864,529

(22) Filed: May 1, 2020

(65) Prior Publication Data

US 2020/0259399 A1    Aug. 13, 2020

Related U.S. Application Data

(62) Division of application No. 13/855,801, filed on Apr. 3, 2013, now Pat. No. 10,770,953.

(51) Int. Cl.
*H02K 9/19* (2006.01)
*H02K 3/24* (2006.01)

(52) U.S. Cl.
CPC .............. *H02K 9/19* (2013.01); *H02K 3/24* (2013.01); *Y10T 29/49009* (2015.01)

(58) Field of Classification Search
CPC ............ H02K 1/148; H02K 9/19; H02K 3/24
See application file for complete search history.

(56) References Cited

U.S. PATENT DOCUMENTS

| 2,695,368 | A |   | 11/1954 | Kilbourne |
| 2,897,382 | A |   | 7/1959  | Hamill |
| 2,975,088 | A |   | 3/1961  | Rossman et al. |
| 3,089,048 | A |   | 5/1963  | Bahn et al. |
| 3,435,262 | A |   | 3/1969  | Bennett et al. |
| 3,459,679 | A |   | 8/1969  | Dickinson |
| 3,801,843 | A |   | 2/1974  | Corman et al. |
| 4,149,309 | A | * | 4/1979  | Mitsui ............... H02K 1/16 29/596 |

(Continued)

FOREIGN PATENT DOCUMENTS

| EP | 1168570 A2 | * | 1/2002 | ............. H02K 3/522 |
| EP | 1630930 A2 |   | 3/2006 | |

(Continued)

OTHER PUBLICATIONS

PCT/US2014/032369 International Search Report & Written Opinion—completed Jul. 21, 2014.

*Primary Examiner* — Peter Dungba Vo
*Assistant Examiner* — Jose K Abraham
(74) *Attorney, Agent, or Firm* — Tarolli, Sundheim, Covell & Tummino LLP

(57) ABSTRACT

A method for building a stator assembly for a rotary electric machine includes providing a plurality of axially extending teeth spaced circumferentially from one another to define slots therebetween. Cooling structure is provided in each slot. Stator windings are wound around the teeth and the cooling structures such that each winding is at least partially disposed in each slot. The windings are electrically connected to form a plurality of phases. The teeth, the cooling structures, and the windings cooperate to form a subassembly. An outer stator core is axially slid over the subassembly to connect the teeth to the outer stator core.

10 Claims, 9 Drawing Sheets

(56) References Cited

U.S. PATENT DOCUMENTS

| | | |
|---|---|---|
| 4,404,486 A | 9/1983 | Keim et al. |
| 4,446,393 A | 5/1984 | Finegold |
| 5,140,204 A | 8/1992 | Cashmore et al. |
| 5,473,207 A | 12/1995 | Hopeck et al. |
| 5,866,965 A | 2/1999 | Baronsky et al. |
| 5,973,427 A | 10/1999 | Suzuki et al. |
| 6,216,513 B1 | 4/2001 | Nakamura et al. |
| 6,304,011 B1 | 10/2001 | Pullen et al. |
| 6,313,556 B1 | 11/2001 | Dombrovski et al. |
| 6,509,665 B1 * | 1/2003 | Nishiyama ............ H02K 3/345 310/194 |
| 7,698,803 B2 | 4/2010 | Mitsui et al. |
| 2002/0117936 A1 | 8/2002 | Dressel |
| 2002/0140312 A1 | 10/2002 | Ikeda et al. |
| 2002/0163275 A1 | 11/2002 | Hsu |
| 2002/0167232 A1 | 11/2002 | Randall |
| 2002/0180284 A1 | 12/2002 | Leflem et al. |
| 2004/0100154 A1 | 5/2004 | Rahman et al. |
| 2005/0269895 A1 * | 12/2005 | Innami ................ B62D 5/0403 310/429 |
| 2006/0043801 A1 | 3/2006 | Adra |
| 2006/0048031 A1 | 3/2006 | Aadsen et al. |
| 2007/0278879 A1 | 12/2007 | Kaminski et al. |
| 2008/0023177 A1 | 1/2008 | Hassett et al. |
| 2008/0197724 A1 | 8/2008 | Cullen et al. |
| 2010/0102651 A1 | 4/2010 | Mohle et al. |
| 2011/0133580 A1 | 6/2011 | Sugimoto et al. |
| 2011/0309695 A1 | 12/2011 | Huard |
| 2014/0139507 A1 | 5/2014 | Jung et al. |

FOREIGN PATENT DOCUMENTS

| | | | |
|---|---|---|---|
| EP | 2136455 A1 * | 12/2009 | ............ H02K 3/522 |
| EP | 2182570 A1 | 5/2010 | |
| JP | 6035929 | 2/1985 | |
| JP | 11252842 | 9/1999 | |
| JP | 2005168265 | 6/2005 | |
| JP | 2005168265 A * | 6/2005 | ............ H02K 9/19 |
| WO | 00/01053 | 1/2000 | |
| WO | 0133698 A1 | 5/2001 | |

* cited by examiner

LIQUID COOLED STATOR FOR HIGH EFFICIENCY MACHINE

RELATED APPLICATIONS

This application is a divisional application of U.S. Ser. No. 13/855,801, filed Apr. 3, 2013, the entirety of which is incorporated by reference herein.

BACKGROUND

Stators for rotary electric machines including electric motors, generators, and the like have employed various types of cooling including air, liquid and two phase cooling. Air blown through the center of the machine had traditionally been the standard with liquid becoming more common in high power applications. Two phase cooling has not developed into a mainstream due to cost and complexity. Liquid cooling is preferred for many high power applications because it generates a more compact design and is compatible with a sealed housing construction which is preferable in many environments.

The most common liquid cooling design uses a cooling jacket wrapped around the outside of the stator assembly. This can be seen in U.S. Pat. No. 5,448,118 entitled LIQUID COOLED MOTOR AND ITS JACKET, included herein by reference. In this design there is an aluminum extrusion that surrounds the outside of the stator and has passages for cooling fluid to pass through. This design cools the stator better than air, but is limited by i) the conductivity between the jacket and the stator, ii) the poor conductivity of the stator laminations, iii) the conductivity of the slot liners, and iv) the poor conductivity between the winding and the slot liners.

Another method that is commonly used is passing cooling through the stator laminations or into slots cut into the stator laminations. Either of these has similar but not as severe disadvantages to the cooling jacket design. Additionally, it typically requires the stator to get larger to accommodate the holes in the magnetic material.

Further, some techniques involve spraying fluid directly on the stator or submerging the stator. These have the disadvantage of either being overly complex or having the fluid cause drag between the rotor and the stator.

There are at least two techniques placing the cooling manifold through the winding slot. One of these is forcing fluid down the center of a conductor. Typically the fluid in this case is a non-conductive oil. This has the disadvantage of requiring a special fluid and some complex manufacturing methods to provide the fluid channel. For extremely high powers in the 10 MW and above range the cooling media is often hydrogen. Other techniques place a pipe or vessel down through the slot with cooling fluid in it. These typically also use non-conductive oil and have non-conductive connections to a manifold at their end. An example of this can be found in U.S. Pat. No. 3,112,415 entitled CONTROL OF WINDING TEMPERATURES OF LIQUID COOLED GENERATORS, incorporated herein by reference.

This design integrates the cooling manifold into the stator slot directly adjacent to the wires that generate the heat. This accommodates use of standard ethylene glycol coolant which is highly desired in the industry, and achieves very compact machines.

Novel methods of cooling by same inventor are also shown in other applications filed by Marvin et al U.S. patent application Ser. No. 13/548,199 entitled LIQUID COOLED HIGH EFFICIENCY PERMANENT MAGNET MACHINE WITH GLYCOL COOLING, Ser. No. 13/548,203 entitled LIQUID COOLED HIGH EFFICIENCY PERMANENT MAGNET MACHINE WITH IN SLOT GLYCOL COOLING, Ser. No. 13/548,207 entitled HIGH EFFICIENCY PERMANENT MAGNET MACHINE WITH CONCENTRATED WINDING AND DOUBLE COILS, and Ser. No. 13/548,208 entitled HIGH EFFICIENCY PERMANENT MAGNET MACHINE WITH LAYER FORM WINDING all filed Jul. 13, 2012, all incorporated herein by reference.

The most common stator winding type is a distributed winding. One type of which is an integer-slot winding wherein the number of slots per pole per phase is an integer. An example of this is a 4 pole 12 slot, 3 phase motor. The number of slots per pole per phase is 1 and therefore an integer. These windings typically require some relatively complex end turns to wire them properly. One type of construction is a diamond form winding that is used in many of the larger, higher voltage, and more reliable machines.

Another type of winding is a concentrated winding when the number of slots per pole per phase is a fraction less than one. These can also be called a non-overlapping concentrated winding. They have the disadvantage of decreasing the inherent efficiency of the device, but make the end turns very simple and can facilitate other advantages. An example of a concentrated winding would be an 8 pole, 9 slot, 3 phase machine. The number of slots per pole per phase is 0.375 in this case. The fundamental power from this configuration is reduced by 5.5%. Concentrated windings can be single layer or double layer designs. Single layer designs have windings that are wound only on alternating stator teeth and only apply where there is an even number of stator slots/teeth. Double layer designs have coils wound on every stator tooth. In this configuration, there is a coil that surrounds each of the teeth on the stator and there are the same number of coils as slots. Further, each slot has half of one coil and half of another coil going through the slot and the end turns are very short. Ideally, the end turns can be as short as the width of the stator tooth.

Double layer concentrated windings have the advantage of being a simple coil wrapped around each tooth. For an external rotor configuration, and using relatively open slots, this allows simple assembly of coils. For the more typical internal rotor configuration, assembly is a bit trickier because even with relatively open slots, the opening is smaller than the slot. This is further complicated if the slot opening is made smaller for motor performance reasons. A typical method of mitigating this issue is to make the teeth separate to either be able to 1) wind the wire directly on the tooth or 2) slide the winding on from the outside. The first method is shown in U.S. Pat. No. 5,583,387 entitled STATOR OF DYNAMO-ELECTRIC MACHINE incorporated herein by reference. The second method is shown in U.S. Pat. No. 4,712,035 entitled SALIENT POLE CORE AND SALIENT POLE ELECTRONICALLY COMMUTATED MOTOR also incorporated herein by reference although it is shown as an external rotor configuration. Both methods are shown as conventional in U.S. Pat. No. 8,129,880 entitled CONCENTRATED WINDING MACHINE WITH MAGNETIC SLOT WEDGES, incorporated herein by reference. The challenge with any stator lamination design that has separate teeth is to secure the teeth structurally so they do not move or break. Even small movements of the teeth can cause acoustic noise. A second challenge is to conFig. the joint in such a way to not significantly disturb the magnetic flux traveling through the laminations. If the joint could be made with zero clearance this would not be a problem, but with real manufacturing tolerances and features required for attachment, this is a major consideration.

Rotary electric machines including electric motors, generators, and the like have employed various methods of constructing stator windings. Some methods are applicable to only certain types of stator windings.

One common method is random winding. This method can use rectangular or round wire, but typically uses round wire. Here the windings are placed by the winding machine with the only requirement that they be located in the correct slot. This is the easiest method of stator winding, but results in the lowest amount of conductor in the slot and therefore the lowest efficiency. This type method can be used with any type of stator winding including concentrated windings.

Another common method is diamond form winding. This method typically uses rectangular wire with various tapes located between conductors to separate any conductors that are significantly different in voltage and the shape of the coil is in a diamond shape. This is a robust winding for higher voltage machines or machines that are prone to partial discharge. This is typically the most labor-intensive type of winding due to the manufacture of the coils and the insertion time to put these coils in the machine from the inside. This labor time can be improved by insertion from the outside which is one of the objects of the design disclosed in this patent.

One winding type that is not typical in motors, is used in certain types of transformers, chokes, and inductors is bobbin layer winding. This type of winding places conductors in exact locations for very accurate stacking of wires. This can achieve a high amount of conductors in a small area for high efficiency. This is not typically used for distributed windings because you are not able to bobbin wind a coil and then insert it into a stator assembly. This is possible with concentrated windings that have removable teeth. The most common wire to use is round wire but it is possible to use square or rectangular wire. Layer winding with rectangular wire is typically laid flat and wound the easy way. This facilitates simpler winding, but one disadvantage of this is the eddy current losses due to slot leakage can be significantly higher. Also, orientation of the rectangular wire can have an impact on thermal performance and depends on the overall heat removal scheme.

Layer winding with rectangular wire can be done edge wound (wound the hard way.) This is shown in U.S. Pat. No. 4,446,393 entitled DYNAMOELECTRIC FIELD ASSEMBLY AND WINDING THEREFOR incorporated herein by reference. In this patent a single layer of rectangular wire is used in each slot and is edge wound. This patent used removable teeth and an internal rotor. U.S. patent application serial number 2010/0066198 filed Mar. 18, 2010 entitled INSERTION OF PRE-FABRICATED CONCENTRATED WINDINGS INTO STATOR SLOTS incorporated herein by reference also shows a single layer of rectangular wire but does not use removable teeth. Edge wound coils can have significantly lower eddy current losses in the wires. The cooling may be better or worse depending on the overall cooling scheme.

SUMMARY OF THE INVENTION

The machine described herein incorporates several novel construction methods in its stator. The key is different approaches to accommodate liquid cooling in the slot in an economical efficient approach.

The preferred design uses either Edge Form Wound Windings for concentrated wound machines or Diamond Form Wound Windings for distributed wound machines. The preferred approach places the cooling manifold in the center of the slot between two sets of windings. In certain applications it makes sense to put at least some the cooling manifold in different locations in the slot. This general approach insures a very good thermal solution that allows much higher current density in the slot. This higher current density in the slot allows significantly higher overall torque density of the rotating machine. The machine described herein also allows the use of conductive fluid such as ethylene glycol.

This configuration uses metallic vessels that contain the liquid cooling medium for high reliability. These metallic vessels are brazed together into manifolds to efficiently direct the liquid to where the heat is generated. The specific geometry and connectivity of the cooling manifolds allows this to be done without detrimental effects to the performance of the machine.

The overall approach leads to a very reliable, compact, efficient, and low cost design.

DETAILED DESCRIPTION

Figure 1:
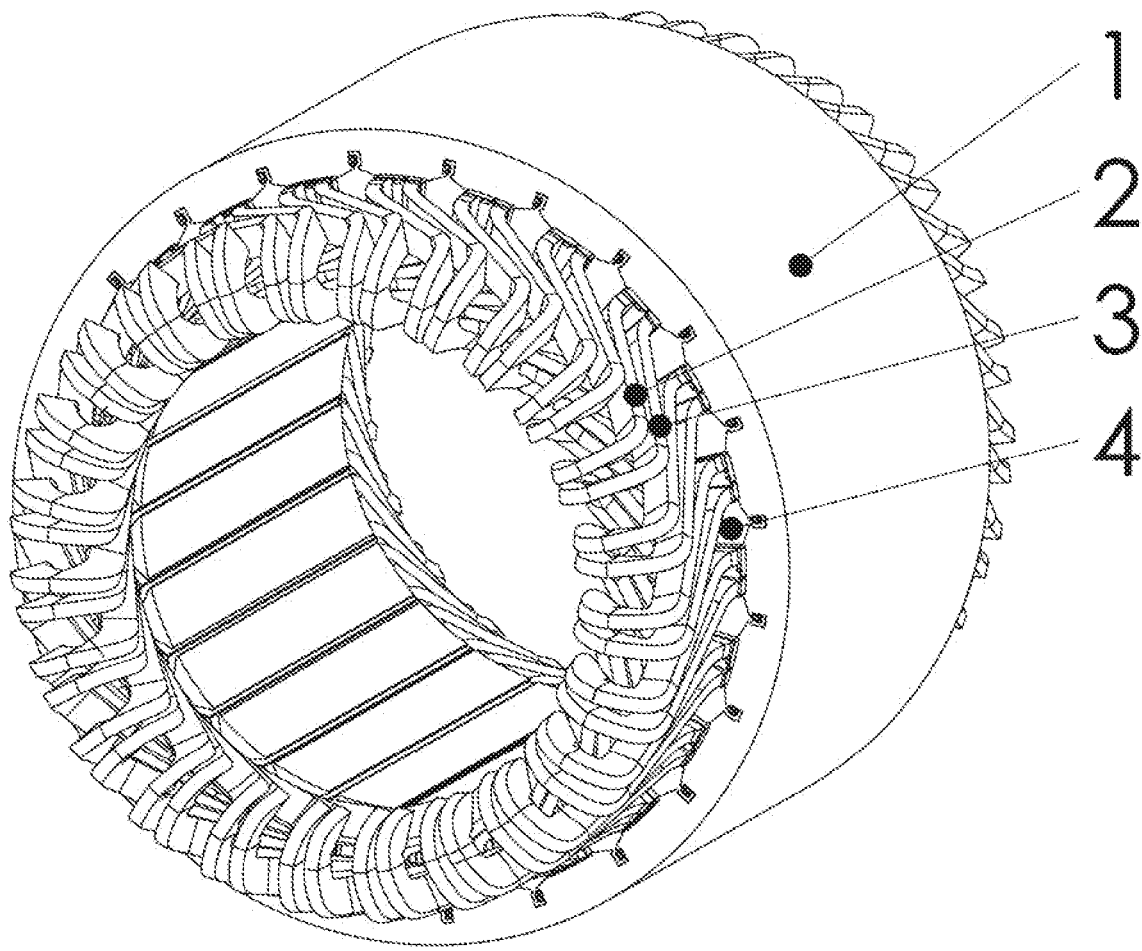
FIG. 1 is a three dimensional view of the stator assembly for a distributed wound machine.
Figure 2:
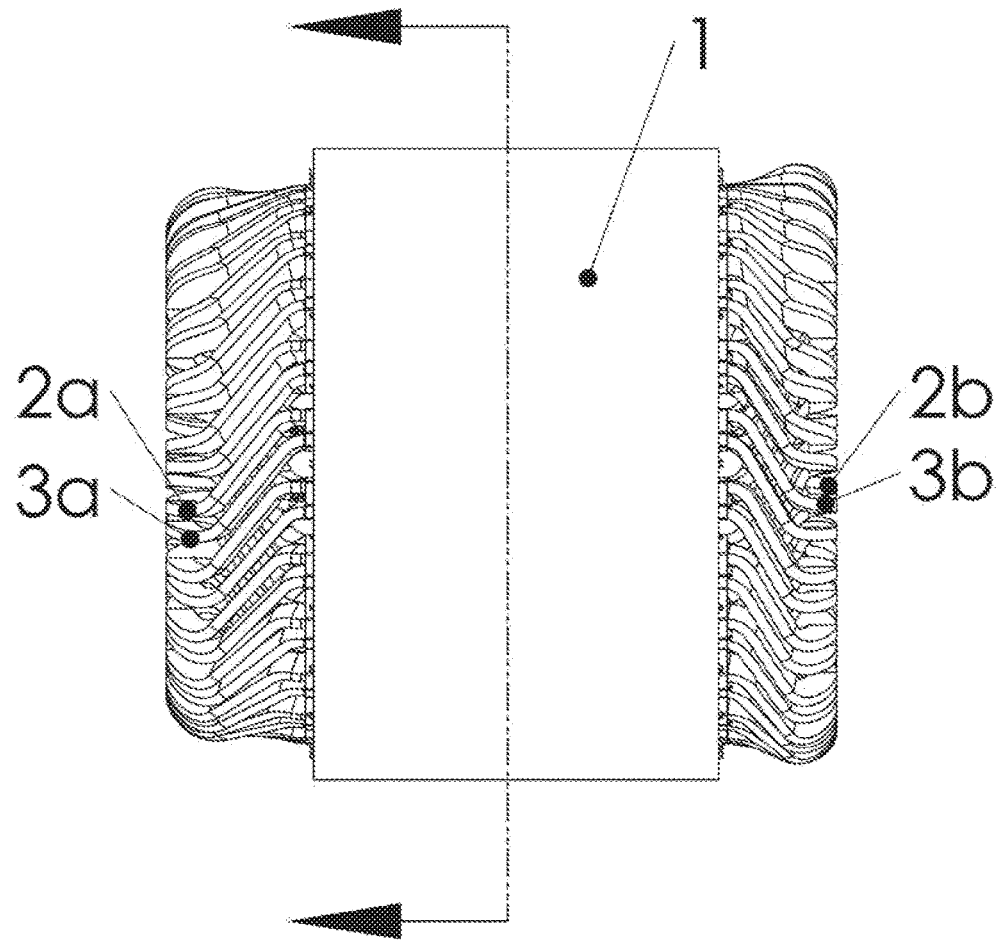
FIG. 2 is a side view of the stator assembly of FIG. 1.
Figure 3:
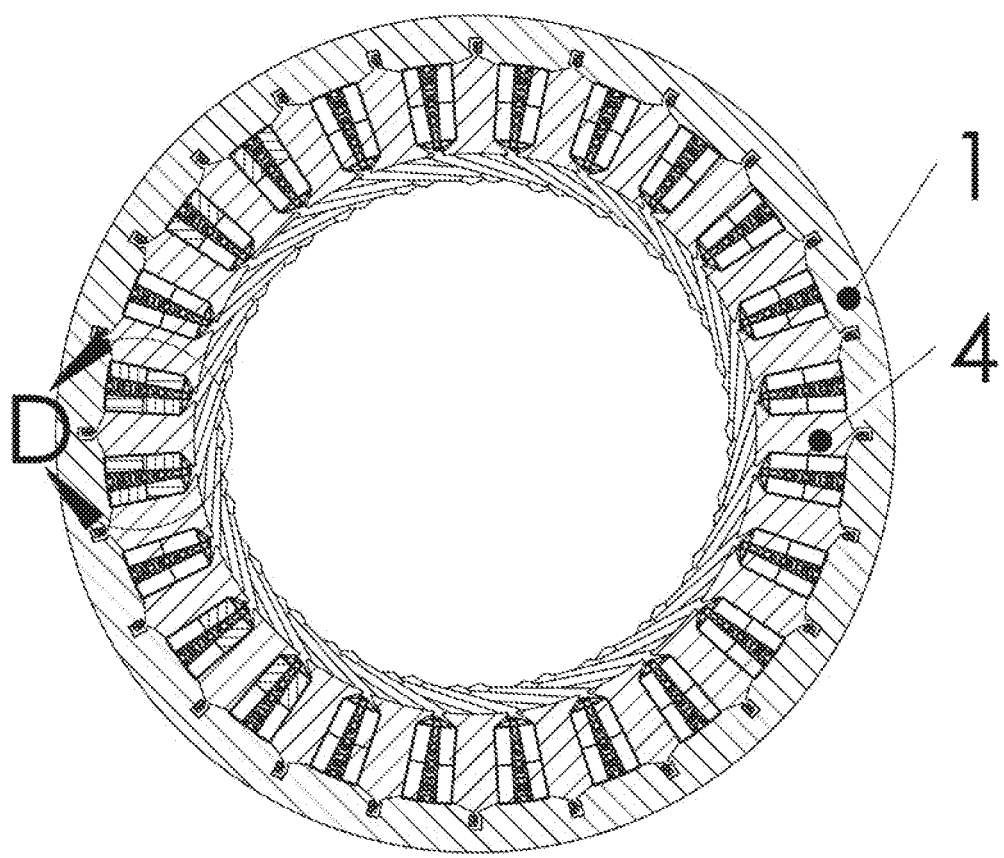
FIG. 3 is a sectional view of the stator assembly shown in FIG. 1 and FIG. 2.

Referring particularly to FIG. 1, a distributed wound stator assembly is shown containing stator yoke 1, stator coil 2, stator coil 3, and stator lamination teeth 4. There are two different stator coils 2, 3 shown due to the fact that they are not evenly spaced and therefore are of slightly different shape. In order to accommodate assembly of the machine the coils 2, 3 are bent inward on at least one end as shown in FIG. 2 where coil ends 2a, 3a are bent inward and coil ends 2b, 3b are bent in a more conventional configuration. The joint between the stator teeth 4 and stator yoke 1 can be seen clearly in FIG. 3.

Figure 4:
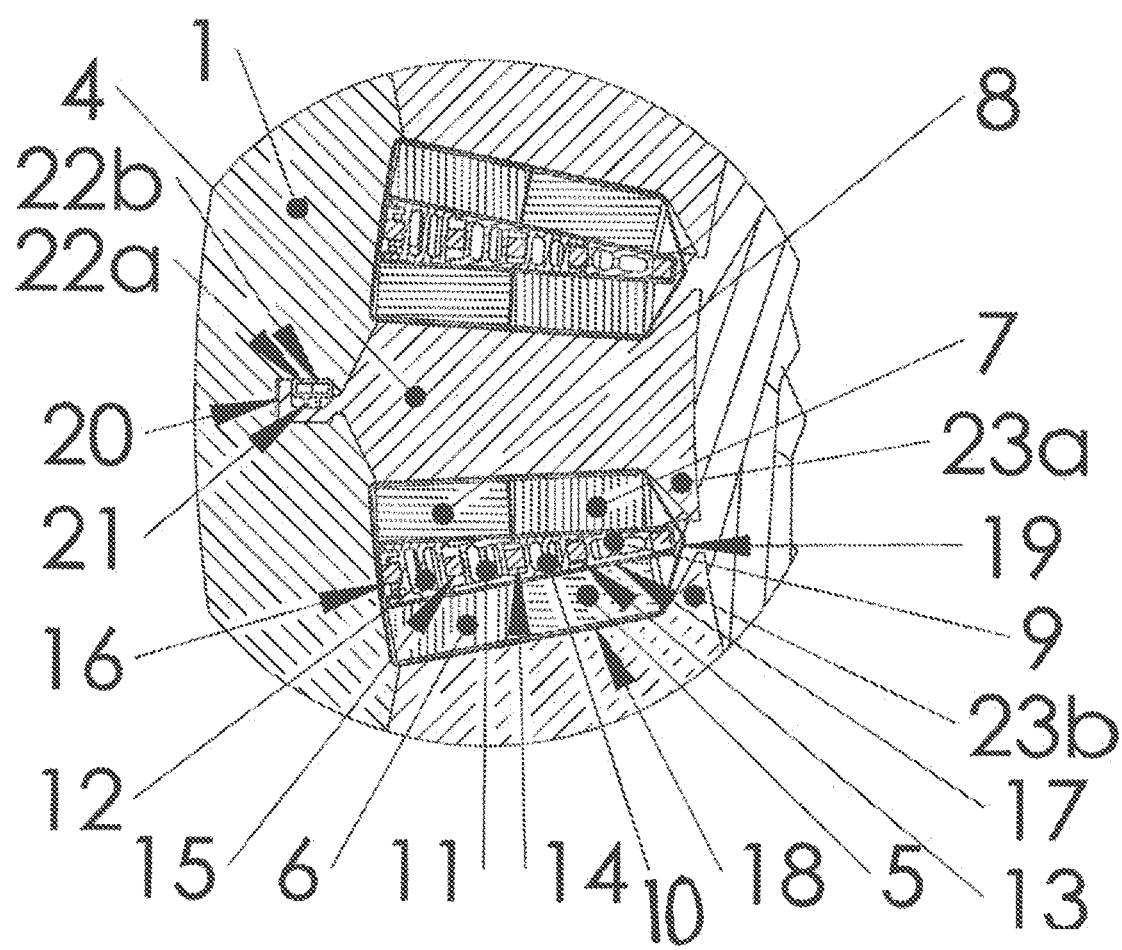
FIG. 4 is an enlarged detail sectional view of the stator assembly shown in FIG. 3.
Figure 8:
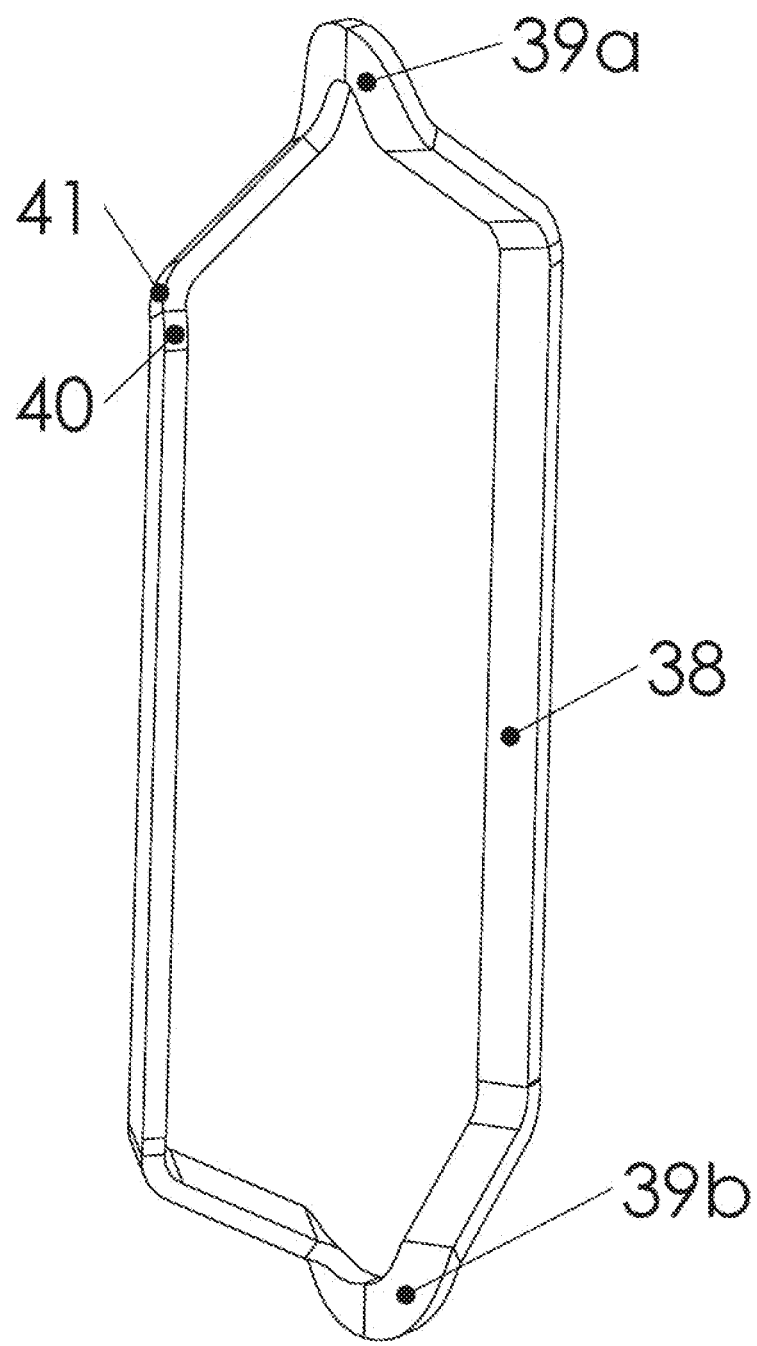
FIG. 8 is a three dimensional view of a diamond coil.

In the cross section view of FIG. 4, the coil bundles can be seen as 5, 6, 7, and 8. Each of these coil bundles can be made up of anywhere from a single turn to many turns. The wire is rectangular in shape with the wide dimension on the wire being in the circumaxial direction of the machine. This is the same direction as the narrow dimension on the coil bundle as shown in FIG. 4. This can be accomplished by forming the coils in a diamond shape as shown in FIG. 8. This diamond shape coil has straight sections 38, pin turns 39a and 39b, bends in the easy way 40 and bends in the hard way 41.

As shown in FIG. 4, the cooling manifold in each slot consist of 4 cooling bars 9, 10, 11, and 12 which are manufactured by aluminum extrusion and therefore electrically conductive. Aluminum is used for ease of manufacturing and the attachment to the slot manifold can be done using a brazing process. Preferably cooling goes down in one slot and up in the other slot in that same cooling bar. The cooling bars are separated by insulator 13, 14, 15, and 16 made of a solid insulator such as PPS. There is also a slot liner 19 that wraps the entire way around the slot with overlap that is made of Nomex or similar. Located between cooling bars 9, 10, 11, 12 and coil bundles 5, 6 is an insulator 17 that is preferably a thermally conductive electrically insulative material. Further, this material preferably is made of a compressible material to accomplish good thermal contact between the cooling bars and the coil bundles. One material that fits this need is filled Silicon rubber gap filler pads sold by Parker Chomerics and others. If additional compliance is needed to absorb tolerance, a compressible pad 18 can be placed between coil bundles 5, 6 and slot liner 19 or alternatively between slot liner 19 and tooth 4.

To accommodate the tooth tips 23a, 23b being located close together and to accommodate the easy insertion of coils, the stator teeth 4 are made a separate part from stator yoke 1 so the coils and cooing manifold can be assembled from the outside diameter. The tooth attachment scheme shown consist of a narrow cantilever beam 20 located on the tooth that is pulled radially outward using wedges 22a and 22b that are electrically insulated from the stator by insulator 21.

It is unusual for a distributed wound stator assembly to have separable teeth. Typically windings are inserted from the inside through wide tooth tip gaps. The preferred assembly approach for this distributed wound stator is to place the teeth 4, windings 5, 6, 7, 8 cooling manifolds 9, 10, 11, 12, and various insulators 17, 18, 19 into an assembly fixture. This assembly would take place at a slightly larger diameter than final size to accommodate tolerances and assembly clearances. The fixture would then draw down the diameter to slightly smaller than the final diameter compressing the compressible members 17, 18 in the slot. The stator yoke 1 is then inserted axially over the assembly. The fixture then allows the diameter to increase outward expanding the compressible members 17, 18 in the slot. Now the wedges 22 and associated insulator 21 can be installed to draw the teeth 4 into final position. Now the assembly is ready for vacuum pressure impregnation (VPI) with an epoxy resin.

Figure 9:
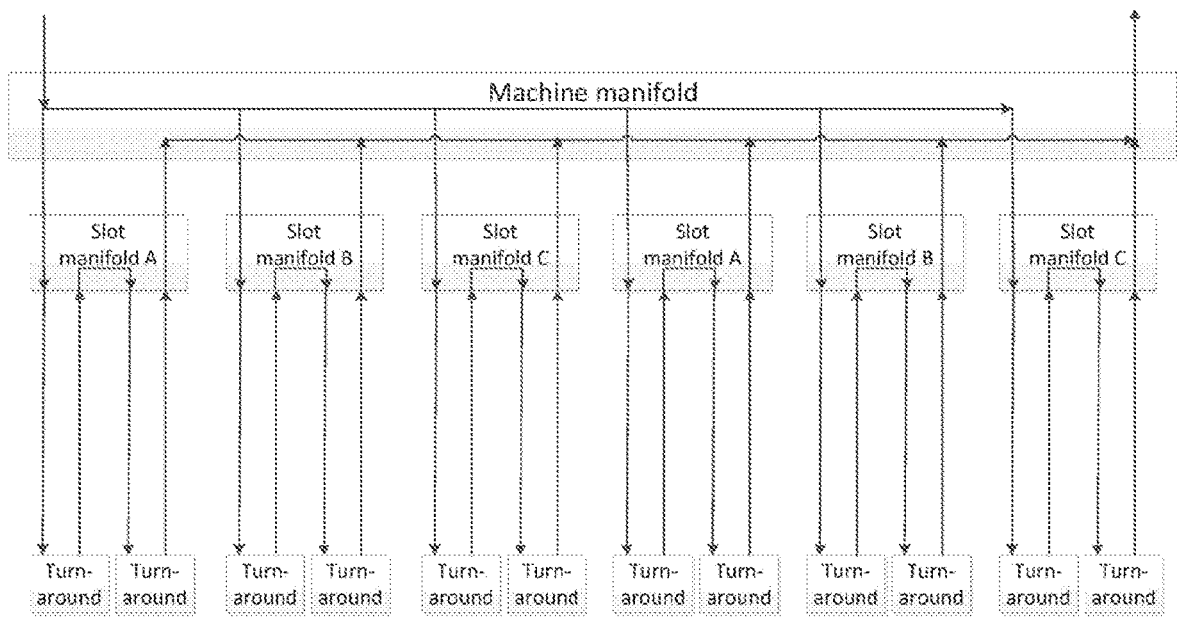
FIG. 9 is a fluid schematic of the cooling system.

FIG. 9 shows a fluid schematic for a 6 slot 3 phase machine where slot manifold A is located in phase A, slot manifold B is located in phase B, and slot manifold C is located in phase C. Each phase constitutes windings that all have the same current in each one. Multiple winding can be connected in series or parallel and still have substantially the same current in each one. In a three phase machine, phases are typically connected in either a wye or delta configuration which does not affect the design.

As shown in FIG. 9, there are two cooling bars for each slot each with its own turnaround. This diagram shows the two cooling bars in each slot fluidically in series, but alternately they could be connected in parallel or partially parallel and series. This diagram shows each of the slot manifolds fluidically in parallel, but alternately they could be connected in series or partially parallel and series. The schematic for stator in FIG. 3 would look much the same except there would be 12 slots and 4 cooling bars for each slot. FIG. 9 shows all fluid interconnections at one end. Alternately, some of the fluid connections can be made on the opposite end, but the number up passages flowing up in each phase must equal the number of passages flowing down in each phase. The media flowing in each of the coolant loops is preferably a 50% mixture of ethylene glycol and water so the liquid will not freeze at cold temperatures.

Figure 5:
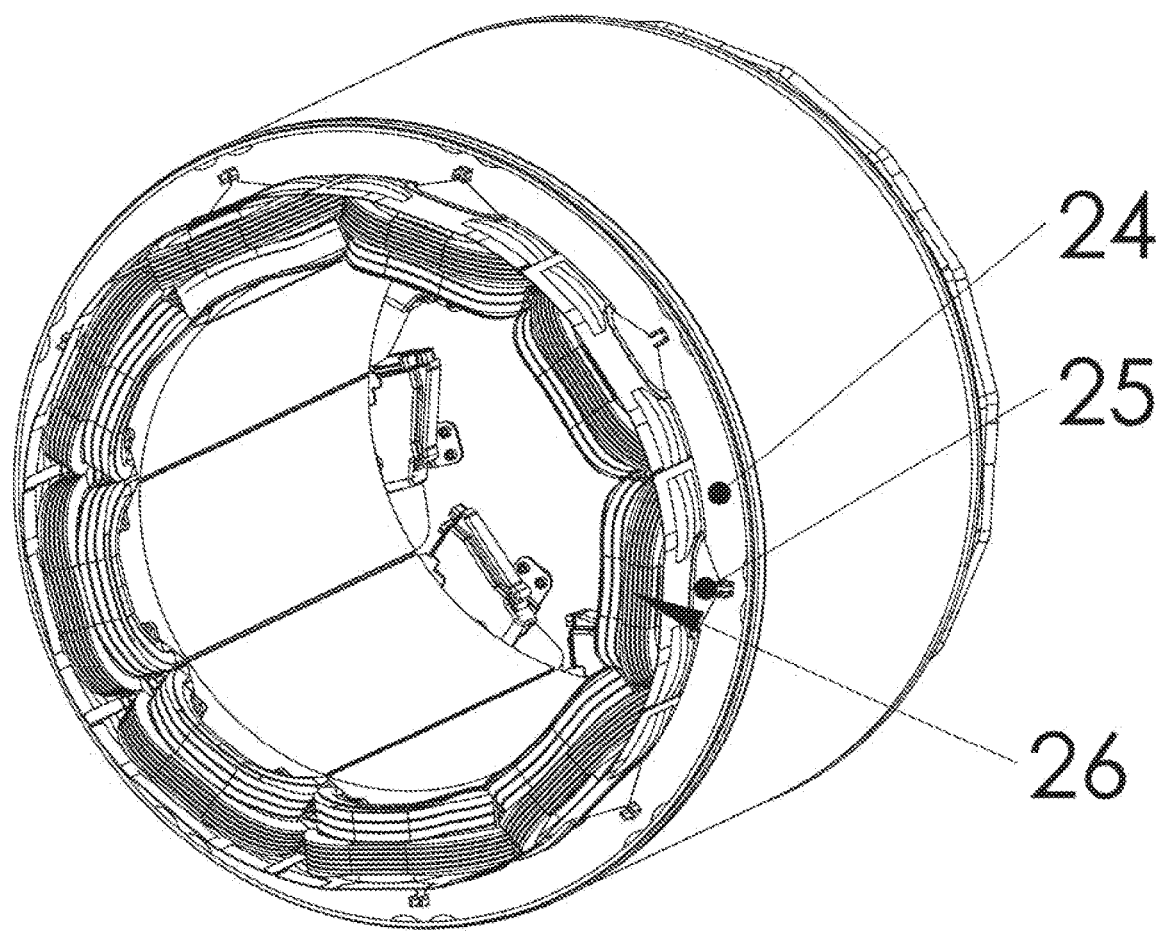
FIG. 5 is a three dimensional view of the stator assembly for a concentrated wound machine.
Figure 6:
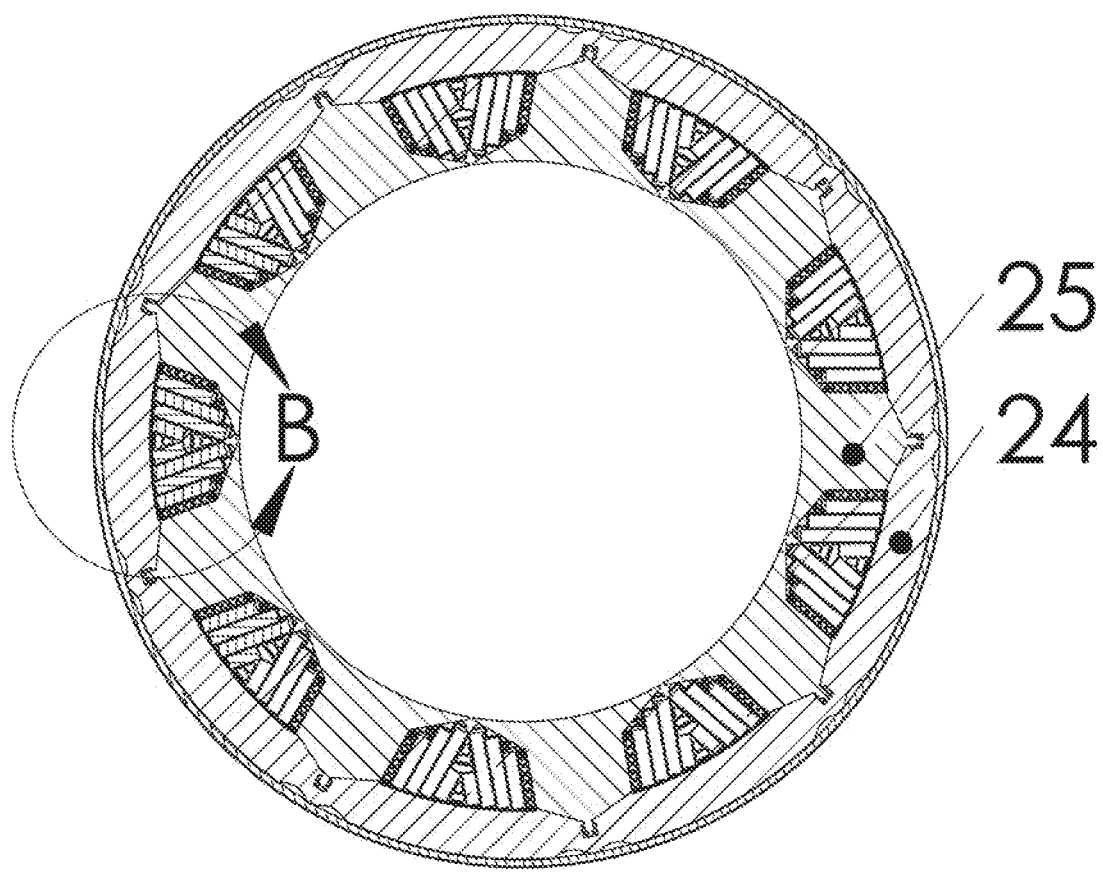
FIG. 6 is a cross sectional view of the stator assembly shown in FIG. 5.
Figure 7:
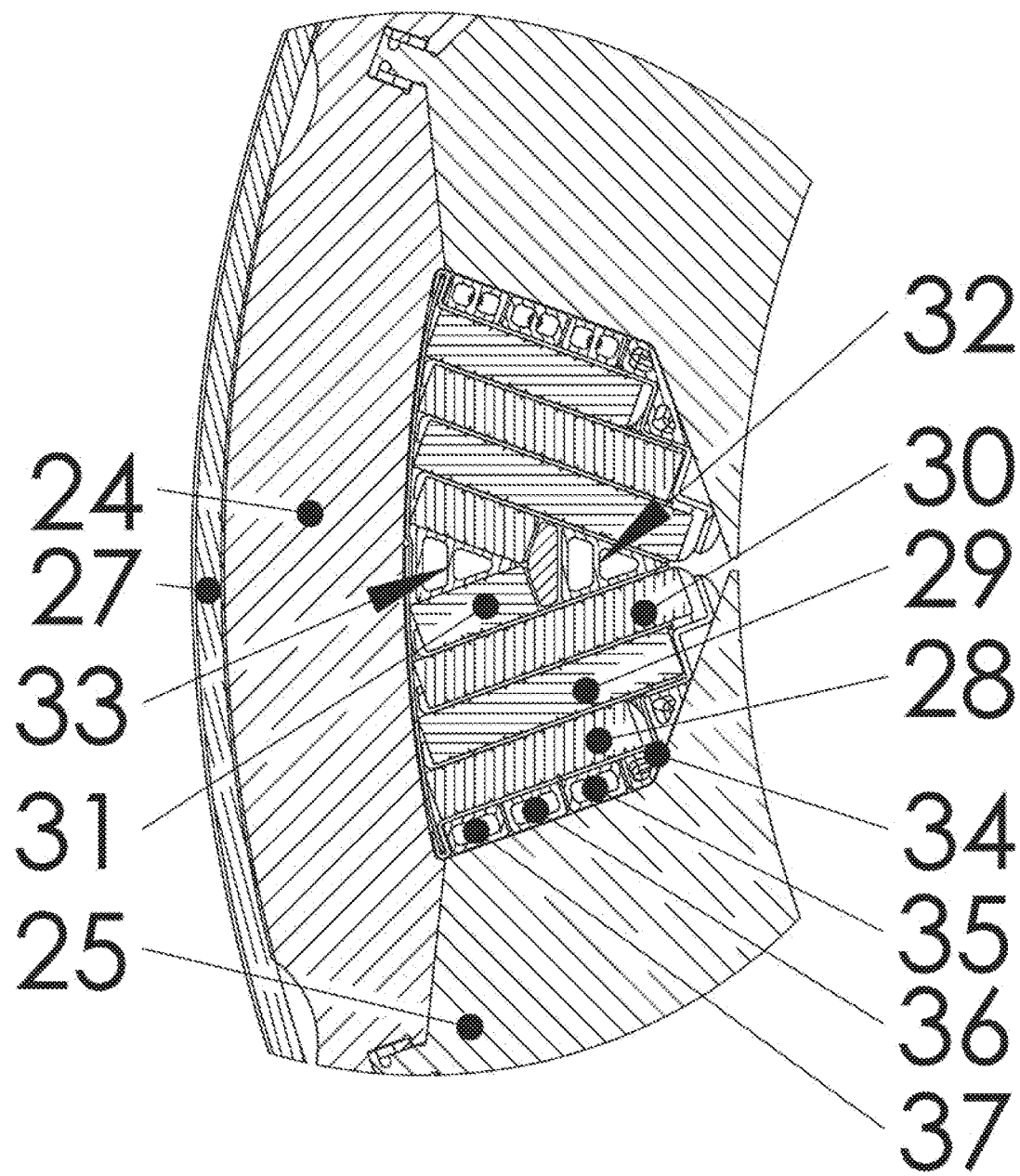
FIG. 7 is an enlarged detail sectional view of the stator assembly shown in FIG. 6.

An alternate configuration in FIG. 5 is shown as a three dimensional view of a concentrated wound stator. The stator yoke 24, stator teeth 25, and windings 26 accomplish this concentrated wound configuration. FIG. 6 shows a cross sectional view that better shows the stator yoke 24 and stator teeth 25. The cross sectional view of the windings is better shown in FIG. 7 where coil bundles 28, 29, 30, 31 are shown that comprise a single winding. This configuration shows cooling bars 32 and 33 located in the middle of the slot between windings as well as cooling bars 34, 35, 36, 37 located between the tooth 25 and the windings. Alternate configurations could have only some of these cooling bars, have fewer or more coil bundles in each winding, or be a distributed wound solution. The wire is rectangular in shape with the wide dimension on the wire being in the circum-axial direction of the machine. This is the same direction as the narrow dimension on the coil bundle as shown in FIG. 7.

What is claimed is:

1. A method for building a stator assembly for a rotary electric machine, comprising the steps of:
providing a plurality of axially extending teeth spaced circumferentially from one another to define slots therebetween;
providing cooling structure in each slot;
winding stator windings around the teeth and the cooling structures such that each winding is at least partially disposed in each slot, the windings being electrically connected to form a plurality of phases, wherein the teeth, the cooling structures, and the windings cooperate to form a subassembly;
radially collapsing the subassembly with a fixture;
axially sliding an outer stator core over the collapsed subassembly to connect the teeth to the outer stator core; and
removing the collapsed subassembly from the fixture to allow the subassembly to automatically radially expand after the outer stator core is slid over the assembly.

2. The method recited in claim 1, wherein each tooth includes a projection that mates with a corresponding recess in the outer stator core.

3. The method recited in claim 1, wherein the stator windings are distributed windings around the teeth.

4. The method recited in claim 1, wherein the stator windings are concentrated windings around the teeth.

5. A method for building a stator assembly for a rotary electric machine, comprising the steps of:
providing a plurality of axially extending teeth spaced circumferentially from one another to define slots therebetween;
providing cooling structure in each slot;
winding stator windings around the teeth and the cooling structures such that each winding is at least partially disposed in each slot, the windings being electrically connected to form a plurality of phases,
providing a compressible insulating layer between the cooling structures and the windings, wherein the teeth, the cooling structures, the compressible insulating layers, and the windings cooperate to form a subassembly;
radially collapsing the subassembly such that the compressible insulating layers are compressed;
axially sliding an outer stator core over the collapsed subassembly to connect the teeth to the outer stator core; and radially expanding the subassembly after the outer stator core is slid over the assembly to automatically expand the compressible insulating layers.

6. A method for building a stator assembly for a rotary electric machine, comprising the steps of:
providing a plurality of axially extending teeth spaced circumferentially from one another to define slots therebetween;
providing cooling structure in each slot;
winding stator windings around the teeth and the cooling structures such that each winding is at least partially disposed in each slot, the windings being electrically connected to form a plurality of phases,
providing a compressible insulating layer between the windings and the teeth, wherein the teeth, the cooling structures, the compressible insulating layers, and the windings cooperate to form a subassembly;
radially collapsing the subassembly such that the compressible insulating layers are compressed when;
axially sliding an outer stator core over the collapsed subassembly to connect the teeth to the outer stator core; and
radially expanding the subassembly after the outer stator core is slid over the assembly to automatically expand the compressible insulating layers.

7. The method recited in claim 1, further comprising enclosing the subassembly in resin after connecting the teeth to the outer stator core.

8. The method recited in claim 1, wherein each cooling structure defines a plurality of coolant passageways radially aligned with one another.

9. The method recited in claim 1, wherein the stator windings comprise rectangular wire formed in multiple turns with each turn having a width extending in a radial direction of the subassembly and a thickness greater than the width extending circumferentially.

10. The method recited in claim 1, wherein the stator windings are wound such that the cooling structures in slots in one of the plurality of phases are not fluidly connected in series with the cooling structures in slots in another of the plurality of phases.

* * * * *